United States Patent [19]

Valyi

[11] 4,289,817

[45] Sep. 15, 1981

[54] DECORATED MULTILAYERED HOLLOW PLASTIC CONTAINER

[76] Inventor: Emery I. Valyi, 5200 Sycamore Ave., Riverdale, N.Y. 10471

[21] Appl. No.: 150,325

[22] Filed: May 16, 1980

Related U.S. Application Data

[60] Continuation of Ser. No. 5,957, Jan. 24, 1979, abandoned, which is a continuation of Ser. No. 632,308, Nov. 17, 1975, abandoned, which is a division of Ser. No. 488,728, Jul. 15, 1974, abandoned, which is a continuation-in-part of Ser. No. 477,751, Mar. 21, 1973, Pat. No. 3,939,239, which is a continuation-in-part of Ser. No. 343,498, Mar. 21, 1973, abandoned, which is a division of Ser. No. 186,984, Oct. 6, 1971, Pat. No. 3,787,157, which is a division of Ser. No. 71,734, Sep. 14, 1970, Pat. No. 3,717,544, which is a continuation-in-part of Ser. No. 100,050, Dec. 21, 1970, Pat. No. 3,719,735.

[51] Int. Cl.³ .................... B65D 11/16; B32B 3/00
[52] U.S. Cl. .................... 428/35; 428/203; 428/204; 428/542; 264/247; 264/509; 264/511; 264/513; 264/516
[58] Field of Search ............... 264/247, 509, 511, 513, 264/516; 428/35, 203, 204, 542

[56] References Cited

U.S. PATENT DOCUMENTS

| 3,633,221 | 1/1972 | Addison | 428/198 X |
| 3,787,157 | 1/1974 | Valyi | 425/112 |
| 3,939,239 | 2/1976 | Valyi | 264/89 |

FOREIGN PATENT DOCUMENTS 2026923  12/1971  Fed. Rep. of Germany ........ 264/97

*Primary Examiner*—P. Ives
*Attorney, Agent, or Firm*—Bachman and LaPointe

[57] ABSTRACT

Lined articles having an outer plastic layer of transparent or translucent plastic and a decorated inner plastic layer so that the decoration is visible through the outer layer. The article is prepared by decorating a plastic liner and molding a transparent or translucent plastic around the decorated liner.

4 Claims, 7 Drawing Figures

DECORATED MULTILAYERED HOLLOW PLASTIC CONTAINER

CROSS REFERENCE TO RELATED APPLICATIONS

This case is a Continuation of Ser. No. 5,957, filed Jan. 24, 1979, now abandoned, which in turn is a Continuation of Ser. No. 632,308, filed Nov. 17, 1975, now abandoned, which in turn is a Divisional of Ser. No. 488,728, filed July 15, 1974, now abandoned, which in turn is a Continuation-in-Part of copending application Ser. No. 477,751 Mar. 21, 1973, now U.S. Pat. No. 3,939,239, which in turn is a Continuation-in-Part of copending application Ser. No. 343,498, filed Mar. 21, 1973, now abandoned which in turn is a Divisional of Ser. No. 186,984, filed Oct. 6, 1971, now U.S. Pat. No. 3,787,157, which in turn is a Division of Ser. No. 71,734, filed Sept. 14, 1970, now U.S. Pat. No. 3,717,544 and Ser. No. 100,050, filed Dec. 21, 1970, now U.S. Pat. No. 3,719,735.

BACKGROUND OF THE INVENTION

This invention relates to the preparation of plastic containers, especially composite parisons having a preformed inner sleeve or lining, said parisons being useful in the formation of composite blow molded containers as described in my prior U.S. Pat. Nos. 3,719,735 and 3,717,544. According to said patents, previously formed sleeve-like liners are applied to a blow core of an injection blow molding apparatus, plastic is injected around said liners while upon the cores and the resultant composite parison, consisting of the liner and the injected plastic, is expanded together into conformance with a blow mold. The method of injection blow molding is well known and described, for example, in U.S. Pat. No. 3,029,468 and others.

Many articles of the foregoing type require decoration, either by the application of labels or by printing on their visible surfaces. In accordance with known processes difficulties are frequently encountered when decorating plastic articles of the foregoing type. For example, the use of labels on the outer surfaces is often considered unattractive and these labels tend to be frequently damaged in shipping and handling. All too often the labels adhere poorly and are completely removed from the article, leaving one in doubt as to the identity of the contents of the articles.

It is known to use heat transfer decorating with decals from a previously printed web of plastic that may be made to adhere to the article by heat and pressure. This procedure, however, is relatively expensive and is limited by the shape of the article to which it may be applied.

The art frequently accepts the disadvantages of labels and decals because they may be printed on roto-gravure presses at high quality levels. However, it would be highly desirable to overcome the disadvantages associated with these methods.

An additional procedure for decorating articles of this type is to print directly thereon. Several procedures may be employed to accomplish this, such as screen printing, elastic pad transfer, offset printing, etc. Unfortunately, different printing processes have different drawbacks when used in connection with articles of the foregoing type. Thus, for example, offset printing is capable of achieving excellent quality, but only if the surface upon which it is to be applied is rigidly supported. A cup or can shape, into which a mandrel may be inserted to support the walls, may be offset printed with excellent quality, in multi-color halftones. A bottle, whose walls cannot be so supported from the inside, is offset printed with inferior quality. Another drawback of offset printing is that one must limit the kind of ink which must be used in connection with most plastics. The suitable inks tend to be of low abrasion resistance and proor adhesion. The better quality inks often cannot be used on plastic articles because they frequently require heat setting at temperatures to which the printed articles cannot be exposed without loss of shape.

Accordingly, it is a principal object of the present invention to provide a method for making decorated plastic articles, and a decorated plastic article which is conveniently and inexpensively obtained and versatile so that it may be used with a variety of printing methods, such as labels, decals and direct printing.

A further object of the present invention is to provide a method and article as aforesaid wherein the decorated surface is protected from such hazards as abrasion damage, shipping damage, poor adhesion and the like, while remaining entirely visible and esthetically attractive.

An additional object of the present invention is to provide a method and article as aforesaid utilizing composite plastic articles.

Further objects and advantages of the present invention will appear hereinafter.

SUMMARY OF THE INVENTION

In accordance with the present invention, it has been found that the foregoing objects and advantages may be readily obtained. The present invention relates to a method of making lined, hollow plastic articles on a core in a mold by molding plastic around a preformed plastic liner on the core in a mold cavity. In accordance with the process of the present invention the preformed plastic liner is decorated, as, for example, by coloring, providing with a predetermined pattern, printing words thereon, applying a printed or decorated label thereto, or by combinations of the foregoing. A transparent or translucent plastic is molded around the decorated liner so that the decoration is visible through the molded plastic. Thus, the decoration is visibly apparent through the molded plastic, and also the outer layer of molded plastic provides protection to the decoration against such hazards as abrasion damage, poor adhesion, and the like.

In a preferred embodiment the decorated composite may be a parison which is substantially expanded to a blow mold, in which case the decoration may be applied to the liner in a foreshortened condition so that the desired configuration appears upon subsequent expansion in the blow mold.

The improved, decorated multilayered hollow plastic article of the present invention has an outer molded first portion of a transparent or translucent plastic material and a decorated inner second portion of a plastic material, wherein the decoration is visible through the molded plastic.

BRIEF DESCRIPTION OF DRAWINGS

The nature of the invention will be better understood from the following description taken in conjunction with the accompanying drawings in which specific embodiments have been shown for the purposes of illustration.

In the drawings.

DETAILED DESCRIPTION

Figure 1:
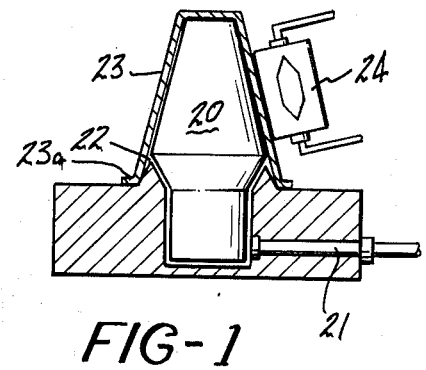
FIG. 1 is a sectional view showing the decoration of a liner on a core.

Referring to the drawings in more detail, FIG. 1 shows a core 20, which may be a blow core which is usually heated by conventional means, and which, if a blow core, contains fluid passageways 21 communicating with slots 22 for the introduction of fluid pressure or suction to the core. Open-ended liner 23, which may be a drawn liner, is provided on the core 20 which may be movable, for example, axially, into and out of engagement with a liner supply means (not shown) for supplying liners to the core, one at a time. Suction applied through fluid passageways 21 and slots 22 may be used to hold liner 23 tightly on the core. Liner 23 may, if desired, be provided with peripheral flange 23a adjacent the open end thereof to aid in sealing to the outer portion.

Figure 1A:
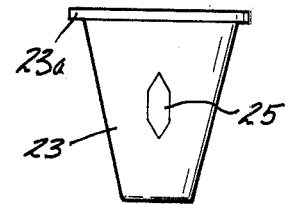
FIG. 1a shows the decorated liner of FIG. 1.

The liner 23 may be decorated using core 20 for internal support by any suitable means, as by printing roller 24 which may be used to provide any suitable decoration on the liner. A predetermined pattern may be used, as the diamond pattern 25 in FIG. 1a, or any other desired pattern. The pattern may be completely colored as shown in FIG. 1a or may utilize a color design or a multicolor design. Alternatively, a printed message may be utilized, or a combination of design and message. The liner may be completely colored in a manner so as to contrast with the transparent or translucent outer layer. The decoration may be imprinted directly on the liner as shown, or applied to a label which is in turn applied to the liner.

If desired, the liners may be preprinted and stored in the preprinted condition for use as desired. In addition, the decoration may be applied directly on a web or sheet of liner material which may then be subsequently formed into the liner having a decoration thereon.

The core 20 with decorated liner 23 thereon is then moved into mold 30 which may be a parison mold or may define the shape of the final desired article. The core with liner thereon may be moved in a downward direction into alignment with mold 30. Thus it can be seen that the entire process can be conducted in a single cycle with the core movable into and out of the various operating cycles. Axial movement for the core may be used, but other operating cycles may be readily applied to the concept of the present invention, as rotary movement of the core or lateral movement of the core into and out of the various operating position. Alternatively, a plurality of cores may be used so that a continuous high production rate may be obtained.

Figure 2:
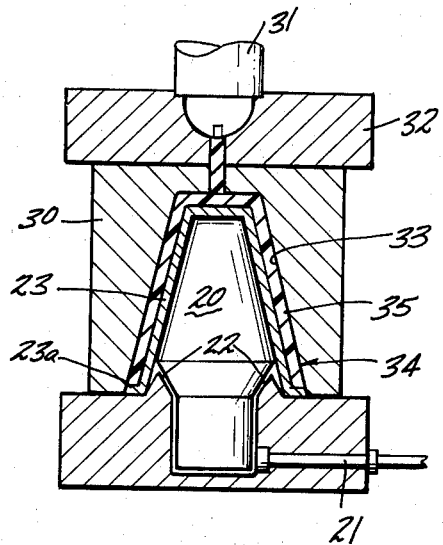
FIG. 2 is a sectional view showing the core and liner of FIG. 1 in a mold.
Figure 2A:
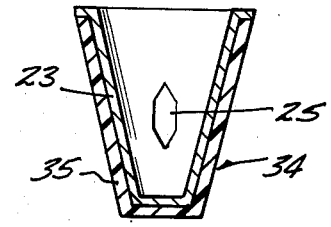
FIG. 2a shows the lined hollow article of FIG. 2.

The liner covered core is positioned in mold 30 as shown in FIG. 2. The mold 30 communicates with injection unit 31 by means of a runner plate 32. Mold cavity 33 is formed between the mold 30 and the core 20 having decorated liner 23 thereon. The assembly is firmly clamped together and hot transparent or translucent plastic is pressed into mold cavity 33 from injection unit or extruder 31 through runner plate 32 around liner 23 which is on the core 20. A composite article 34 is thus molded, which may be a composite parison, forming a composite structure the inner layer of which is comprised of the material of the decorated liner 23 while its outer layer 35 is the transparent or translucent plastic material present around the liner 23 from the extruder 31. The composite hollow plastic article 34 is clearly shown in FIG. 2A wherein the decoration 25 on liner 23 is clearly visible through the transparent or translucent outer molded layer 35.

As indicated hereinabove, hollow article 34 may be the final article of the present invention. If desired, article 34 may be a composite parison which is then transferred into blow mold 40 while still on core 20, as by continuing the axial movement of the core and moving blow mold 40 into alignment therewith, by rotary movement, or in other ways known in the art. The blow mold 40 has an internal cavity 41 corresponding in shape to the shape of the desired article. The parison will normally be hot enough for blowing upon introduction into the blow mold, although heating means may be provided in the core. The parison is expanded by means of fluid pressure introduced through fluid passageways 21 and slots 22 into conformance with the blow mold cavity 41 to form composite or lined decorated container 42 which may be removed from the blow mold upon separation of the core therefrom. The blow mold may be constructed in two halves to facilitate removal of container 42.

Naturally, numerous variations in container design are possible. For example, a neck mold may be provided for forming a molded neck portion, which neck mold may be used for transferring the parison from the parison mold to the blow mold and thus freeing the first core for a new process cycle while a second core is used to complete the blowing operation.

Figure 3:
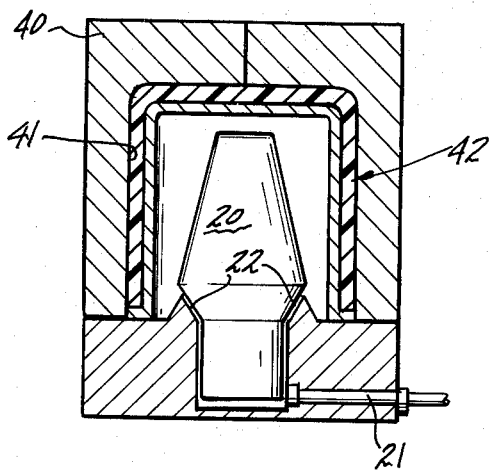
FIG. 3 is a sectional view showing the core with the article of FIG. 2 thereon in blow position within a blow mold.
Figure 3A:
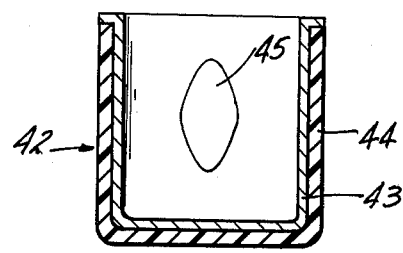
FIG. 3a shows the lined hollow article of FIG. 3.

The decorated, multilayered hollow plastic article 42 produced in FIG. 3 and exhibiting the characteristics of blow orientation is clearly shown in FIG. 3a wherein the inner portion 43 is formed from liner 23 and the outer portion 44 is formed from molded layer 35. Decoration 45 is clearly visible through the transparent or translucent outer portion 44. The decoration 45 is a different shape than decoration 25, having been distorted by the blowing operation. Thus, if the composite is to be expanded by a blowing operation, the decoration applied to the liner should be foreshortened so that the desired configuration appears upon subsequent expansion in the blow mold.

Figure 4:
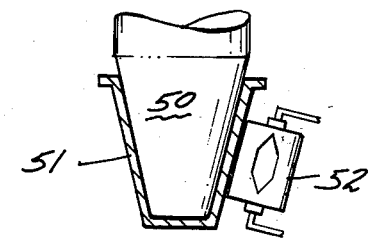
FIG. 4 is a sectional view showing the decoration of a liner on a mandrel.

As indicated hereinabove, the liner should be supported internally, as liner 23 is supported by core 20 in FIG. 1. Alternatively, one may use a means for internally supporting the liner, for example, supporting mandrel 50 as shown in FIG. 4 to support liner 51 for engagement with printing roller 52.

A wide variety of plastic materials may be used in the present invention. Thus, one may select the material of the liner so as to have one of the properties that the finished article is to have and the material of the injected plastic so as to have another of the desired properties. The liner may contain several layers of laminations if desired to provide a liner having the combined properties of several plastics, with the printing on the outermost layer. Naturally different plastics are more suitable for receiving printing. Therefore, a multilayered liner is advantageous as wherever possible one should choose to print on that layer which is most receptive to printing. Typical liner materials include the acetal polymers, polyolefins, ionomer resins, polyallomer copolymers, polystyrene, polyvinylidene chloride, polyvinyl chloride, polycarbonates, acrylonitrile, etc. The outer layer should be a transparent or translucent plastic so that the liner decoration is visible therethrough. Generally most thermoplastics are transparent or translucent, and some thermosetting plastics are translucent. Typical materials which can be used include polyolefins, polystryene, polyvinyl chloride, styrene-acrylonitrile copolymers, methyl methacrylates, polycarbonates, polyesters, novalaks, etc. It is naturally within the scope of the present invention to produce finished articles having a desirable appearance by providing different colors on the liner and degrees of transparency on the material that is molded therearound.

Thus it can be seen that the article of the present invention carries a decoration, which may be a printed message, under the shield of a transparent or translucent outer layer. The present invention is versatile and has wide application by simply inserting a suitable decorated film in a mold, secured from being displaced, as by mechanical means or by vacuum, and molding a transparent or translucent layer around it.

The article of the present invention is characterized by numerous advantages. The decoration may be applied to the liner in the highest quality, by inexpensive means. The decoration is protected from damage since it is under a covering layer. The appearance of the decoration is attractive in that it is visibly distinguishable through a finite layer, which lends it depth.

In addition to the above, the choice of inks is substantially widened since the liner is fully supported, not only during printing, but also while being heated on the core. Hence, one may readily employ inks that will set at the high temperatures to which the liner may be exposed.

Since the liners must fit a core, they are always so shaped that a mandrel may be inserted into them, as in FIG. 4. Accordingly, they may be readily offset printed, and also the application of decals or labels is facilitated. If decals or labels are used and if the article is to be deformed by blowing as shown in FIG. 3, one must employ materials that will be able to deform together with the liner, as for example, polystryene.

In accordance with the present invention one may use an elevated temperature setting ink by decorating the liner therewith, applying the decorated liner to a core or other rigid surface in an injection mold that is heated to at least the setting temperature of the ink, and then dwell for a period of time to set the ink. Naturally, the elevated temperature of the freshly molded plastic provides the heating for setting of the ink.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An open neck, blow molded multilayered hollow plastic container exhibiting the characteristics of blow orientation having an outer, pressure molded first portion of a transparent plastic material and a drawn inner second portion of plastic material having substantially continuous side and end walls and an open ended neck, wherein the inner portion is colored so that said color is visible through the molded plastic, said outer pressure molded first portion having substantially continuous side and end walls and an open neck conforming to the side and end walls and open ended neck of said inner portion.

2. A container according to claim 1 wherein said color is a single color.

3. A container according to claim 1 wherein the finished article has a desirable appearance by providing different colors and degrees of transparency in the inner portion and the material therearound.

4. A container according to claim 1 wherein said color is an elevated temperature setting ink and wherein said pressure molded first portion provides the heating for setting of the ink.

* * * * *